United States Patent
Takemura et al.

(10) Patent No.: US 6,228,473 B1
(45) Date of Patent: May 8, 2001

(54) FIBER-REINFORCED COMPOSITE MATERIALS

(75) Inventors: Shinichi Takemura; Yoshio Soda, both of Yokohama; Hideyuki Ohno, Tokyo; Yutaka Arai, Himeji; Tomohiro Nakanishi, Kimizu, all of (JP)

(73) Assignees: Nippon Mitsubishi Oil Corporation; Nippon Steel Corporation; Nippon Graphite Fiber Corporation, all of Tokyo (JP)

( * ) Notice: Subject to any disclaimer, the term of this patent is extended or adjusted under 35 U.S.C. 154(b) by 0 days.

(21) Appl. No.: 09/334,790

(22) Filed: Jun. 16, 1999

(30) Foreign Application Priority Data

Jun. 16, 1998 (JP) .................................. 10-168264
Sep. 3, 1998 (JP) .................................. 10-249638

(51) Int. Cl.$^7$ ................ B32B 5/08; B32B 5/28
(52) U.S. Cl. .................. 428/295.1; 428/295.4; 428/297.1; 428/299.1; 428/301.4
(58) Field of Search .............. 428/295.1, 295.4, 428/297.1, 299.1, 301.4

(56) References Cited

U.S. PATENT DOCUMENTS 5,137,594 * 8/1992 Asada et al. ................ 156/307.4
5,151,322 * 9/1992 Kimoto et al. ................ 428/303
5,344,689 * 9/1994 Ide et al. ................ 428/114

* cited by examiner

Primary Examiner—Blaine Copenheaver
(74) Attorney, Agent, or Firm—Scully, Scott, Murphy & Presser

(57) ABSTRACT

Disclosed is a plate-like carbon fiber-reinforced composite material comprising carbon fibers, wherein that the carbon fibers have a strain at compressive break of 1.7 to 5%, a tensile elastic modulus of 5 to 160 GPa, and a density of 1.5 to 1.9 g/cm$^3$ and further in that the composite comprising said carbon fibers cause no delamination by an impact energy of less than 1.4 J/mm in the test of compression after impact in accordance with JIS K 7089.

8 Claims, No Drawings

FIBER-REINFORCED COMPOSITE MATERIALS

FIELD OF THE INVENTION

The present invention relates to a fiber-reinforced composite material and more particularly relates to a plate- or beam-like fiber-reinforced composite material suitable for use in leaf springs, bodies for trucks and passenger cars, parts for artificial satellites, structural members for aircraft, robot arms, ski boards, and others.

BACKGROUND OF THE INVENTION

Fiber-reinforced composite materials (or FRP) are widely used in many applications such as various industries, sporting goods and equipment for leisure time amusement as well as space and aviation fields. Owing to its properties characterized by light weight, high strength, and high elastic modulus, a carbon fiber-reinforced material (or CFRP) is used in a large amount for parts, which need to be light and highly rigid, among fiber-reinforced composite materials made by using fibers such as glass fibers, aramid fibers, boron fibers, and the like. For example, in industrial fields such as printing machines and film making machines, increase in productivity has been made possible by the use of a composite roll which is prepared by metal- or resin-plating the surface of a CFRP core and whose weight is 20 to 40% less than that of a conventional aluminum alloy roll.

Excellent strength and impact resistance are indispensable for a fiber-reinforced material. In the field of automotive parts, use of FRP for truck bodies and use of CFRP for leaf springs have been hither promoted. In these applications, in order to protect the persons in the vehicle in case an accident should happen, it is very important to impart excellent strength and impact resistance to the structural members of bodies and it is also very important to impart excellent impact resistance to the leaf springs and others which are subjected to the repetition of impact load in order to ensure long-pending reliability of automobiles. Conventionally, automotive parts have been made lighter by use of the above-described FRP in comparison with automotive parts made of metal. However, automotive parts using FRP cannot be said to be satisfactorily light because these automotive parts made of FRP need to maintain the same strength and impact resistance as those of automotive parts made of metal.

Moreover, lowness of elastic modulus, namely excellence in flexibility, is also one of the very important properties of a fiber-reinforced composite material depending on applications. In particular, the flexibility of sporting goods is said to exert a significant influence on the feeling of the players. For example, a golf club using a flexible shaft is said to be beneficial to beginners and female golfers. This is because, although their swing speed is slow, the use of such a club enables them to increase the head speed of the club so that a longer flying distance of ball can be expected due to the pliant suppleness of the shaft. Similarly, flexible ski boards are said to be suitable to beginners or women playing golf because turns utilizing the flexibility of boards become possible.

Conventionally, in order to obtain the above-mentioned shaped articles having low rigidity, glass fibers have often been used. However, the use of glass fibers is associated with disadvantages. For example, since the density of glass fiber is larger than that of carbon fiber or the like, the use of glass fiber brings about increase in weight of the shaped articles. Further, since the compressive strength of glass fiber is low despite its high tensile strength, a shaped article made of a glass fiber-reinforced composite material does not exhibit sufficient strength. Furthermore, in the aspect of vibration characteristics, since the vibration damping characteristics of glass fibers are inferior to those of carbon fibers, a shaped article made of a glass fiber-reinforced composite material exhibits a feeling inferior to that of a shaped article made of a carbon fiber-reinforced composite material.

Meanwhile, when designing FRP, it must be taken into account that FRP has anisotropy. That is, although high strength and elastic modulus are exhibited in the direction of orientation of the reinforcing fibers, both of strength and elastic modulus are extremely low in the direction at a right angle to the direction of orientation of the reinforcing fibers because the tensile strength of the matrix resin and the bonding strength in the interface between the matrix resin and the reinforcing fibers dominate the characteristics in that direction.

Further, caution must be exercised to the fact that delamination is liable to occur in FRP laminated materials. For example, in the case of FRP used for aircraft, a flying body such as a bird may collide with the body of the aircraft during flight or otherwise a member of maintenance staff may inadvertently drop a tool such as wrench, spanner, or the like on the body of the aircraft during maintenance service on the ground. These impacts cause serious delamination inside the FRP laminated materials and a significant reduction in mechanical properties, in particular compressive strength, thus presenting a big problem.

On the other hand, since repeated impact takes place in leaf springs of automobiles, it is very important to increase interlayer fracture toughness. As to structural members of bodies, it is also important to inhibit the delamination in order not to aggravate the mechanical properties by impact caused by, for example, an accident.

Heretofore, various methods have been employed to increase interlayer fracture toughness of FRP by making the matrix resin more tenacious or by using thermoplastic resins particles or short fibers between the layers of an FRP laminated material. However, these methods have been necessarily associated with disadvantages such as increase of process steps.

OBJECTS OF THE INVENTION

An object of the present invention is to solve the problems of the prior art and to provide a fiber-reinforced composite material which is lightweight and has excellent strength, impact resistance, and flexibility.

Another object of the present invention is to solve the problems of the prior art and to provide a fiber-reinforced composite material which has excellent interlayer fracture toughness and mechanical properties less vulnerable to impact load.

SUMMARY OF THE INVENTION

First, the present invention provides a plate- or beam-like carbon fiber-reinforced composite material having carbon fibers aligned nearly parallel to the longitudinal direction, characterized in that the carbon fibers have a tensile elastic modulus of 5 to 160 GPa, a strain at compressive break of 1.7 to 5%, and a density of 1.5 to 1.9 g/cm$^3$ and further in that the composite comprising said carbon fibers exhibits a mode I interlayer fracture toughness $G_{IC}$ (at 5% offset in accordance with JIS K 7086) of 0.15 to 4.5 kJ/m$^2$, a mode II interlayer fracture toughness $G_{IR}$ (at propagation in accordance with JIS K 7086) of 0.20 to 5 kJ/m², a mode II interlayer fracture toughness $G_{IIC}$ (at 5% offset in accordance with JIS K 7086) of 0.45 to 9.5 kJ/m², and a mode II interlayer fracture toughness $G_{IIR}$ (at propagation in accordance with JIS K 7086) of 0.5 to 10 kJ/m², and the composite produces no delamination by an impact energy of less than 1.4 J/mm in the test of compression after impact in accordance with JIS K 7089.

Second, the present invention provides a sandwich-structured plate- or beam-like carbon fiber-reinforced composite material made up of at least one plate- or beam-like fiber-reinforced composite material comprising carbon fibers having a tensile elastic modulus of 200 to 1000 GPa such that additional carbon fibers are disposed on the front and back faces or the front and back outermost faces of the composite material, characterized in that said additional carbon fibers have a tensile elastic modulus of 5 to 160 GPa, a strain at compressive break of 1.7 to 5%, and a density of 1.5 to 1.9 g/cm³ and further in that the composite comprising said additional carbon fibers exhibits a mode I interlayer fracture toughness $G_{IC}$ (at 5% offset in accordance with JIS K 7086) of 0.15 to 4.5 kJ/m², a mode II interlayer fracture toughness $G_{IIR}$ (at propagation in accordance with JIS K 7086) of 0.20 to 5 kJ/m², a mode II interlayer fracture toughness $G_{IIC}$ (at 5% offset in accordance with JIS K 7086) of 0.45 to 9.5 kJ/m², and a mode II interlayer fracture toughness $G_{IIR}$ (at propagation in accordance with JIS K 7086) of 0.5 to 10 kJ/m².

Third, the present invention provides a sandwich-structured plate- or beam-like carbon fiber-reinforced composite material made up of at least one plate- or beam-like fiber-reinforced composite material comprising carbon fibers having a tensile elastic modulus of 200 to 1000 GPa such that additional carbon fibers are disposed on the front and back faces or the front and back outermost faces of the composite material, characterized in that said additional carbon fibers have a tensile elastic modulus of 5 to 160 GPa, a strain at compressive break of 1.7 to 5%, and a density of 1.5 to 1.9 g/cm³ and further in that the composite comprising said additional carbon fibers produces no delamination by an impact energy of less than 1.4 J/mm in the test of compression after impact in accordance with JIS K 7089.

Fourth, the present invention provides a fiber-reinforced composite material which is described in item 2 or 3 above, characterized in that the composite material has excellent impact resistance exhibiting a Charpy impact value of 125 kJ/m² or more.

DETAILED DESCRIPTION OF THE INVENTION

The present invention addresses an improvement of mechanical properties, in particular the impact resistance and interlayer fracture toughness, of conventional carbon fiber-reinforced composite materials. Conventional carbon fiber-reinforced composite materials has a drawback that compressive strength is insufficient although tensile strength is very high as a result of improvement works. For example, a carbon fiber, which is widely used as a PAN-based carbon fiber and has a tensile elastic modulus of 230 GPa, provides a unidirectional composite plate whose compressive strength is only 1400 MPa in contrast with a tensile strength of 2700 MPa.

In assessing the mechanical properties of structural members including fiber-reinforced composite materials, a strain at break is no less important than strength. When a stress is produced in a structural member, the deformation produces a strain. That is, a tensile strain is produced by a tensile stress and a compressive strain is produced by a compressive stress. If the value of tensile or compressive strain exceeds a strain at tensile or compressive break, fracture takes place. In the case of the above-mentioned PAN-based carbon fiber having a tensile elastic modulus of 230 GPa, since the unidirectional composite plate has a strain at tensile break of 1.7% and a strain at compressive break of 1.2%, a compressive fracture takes place when a compressive stress is produced in the unidirectional composite plate and the value of the compressive strain produced exceeds the above-mentioned strain at compressive break.

In order to measure the impact strength of a structural member, a Charpy impact test is often used. Charpy impact test is conducted by so-called 3-point bending in which an impact stress is applied to the center of the test specimen free-supported at two points in the vicinity of both ends. When a structural member receives a 3-point bending stress, a compressive strain is produced on the side to which the impact stress is applied, while a tensile strain is produced on the opposite side. In the case of the above-mentioned PAN-based carbon fiber having a tensile strength of 230 MPa, since a strain at compressive break is markedly low in comparison with a strain at tensile break, flexural fracture occurs starting from the vicinity of the impact stress-loaded point in which a compressive strain is produced. Accordingly, despite its high tensile strength, a composite material comprising the above-mentioned PAN-based carbon fiber could not increase its impact strength because the fracture behavior was dominated by the compressed side.

The present inventors directed their attention to the above-described fracture behavior of a conventional carbon fiber-reinforced composite material having a tensile strength of 200 to 1000 GPa. As a result, they have found that the fracture behavior dominated by the compressed side in the conventional carbon fiber-reinforced composite material having a tensile strength of 200 to 1000 GPa can be inhibited by disposing carbon fibers, which have a strain at compressive break of 1.7 to 5%, a tensile elastic modulus of 5 to 160 GPa and a density of 1.5 to 1.9 g/cm³, on the front and back faces or the front and back outermost faces of the composite material. Based on this finding, they have achieved the invention of a plate or beam composed of a fiber-reinforced material having very good impact resistance.

Further, the present inventors have found that the use of carbon fibers, characterized in that the composite comprising the carbon fibers exhibits a mode I interlayer fracture toughness $G_{IC}$ (at 5% offset in accordance with JIS K 7086) of 0.15 kJ/m² or more, a mode II interlayer fracture toughness $G_{IIR}$ (at propagation in accordance with JIS K 7086) of 0.20 kJ/m² or more, a mode II interlayer fracture toughness $G_{IIC}$ (at 5% offset in accordance with JIS K 7086) of 0.45 kJ/m² or more, and a mode II interlayer fracture toughness $G_{IIR}$ (at propagation in accordance with JIS K 7086) of 0.50 kJ/m² or more, and the composite produces no delamination by an impact energy of less than 1.4 J/mm in the test of compression after impact in accordance with JIS K 7089, enables to provide a composite having excellent interlayer fracture toughness and mechanical properties less vulnerable to impact load. Based on this finding, they have achieved the invention of a plate or beam composed of a fiber-reinforced material having very good mechanical properties.

The stain at compressive break of the carbon fibers needs to be 1.7 to 5%, and preferably 2 to 5%.

The strain at compressive break of the carbon fibers of 1.7% or less is not desirable, because the carbon fiber-reinforced composite material to be obtained cannot have sufficient impact resistance.

Further, the strain at compressive break of the carbon fibers of 1.7% or less is not desirable, because, when given an impact, the carbon fiber-reinforced composite material to be obtained tends to cause delamination.

A carbon fiber-reinforced composite material of the invention is in the shape of a plate or beam in which carbon fibers are disposed nearly in parallel to the longitudinal direction.

The above-described carbon fiber-reinforced composite material of the invention is characterized in that the carbon fibers have specific properties.

The tensile elastic modulus of the carbon fibers needs to be 5 to 160 GPa, preferably 5 to 150 Gpa, and more preferably 5 to 120 GPa.

The tensile elastic modulus of the carbon fibers of 160 GPa or more is not desirable, because the carbon fiber-reinforced composite material to be obtained cannot have sufficient flexibility.

Further, the tensile elastic modulus of the carbon fibers of 160 GPa or more is not desirable, because the carbon fiber-reinforced composite material to be obtained cannot have sufficient interlayer fracture toughness.

The density of the carbon fibers needs to be 1.5 to 1.9 g/cm$^3$. This is because a density exceeding 1.9 g/cm$^3$ undesirably increases the weight of the shaped article to be obtained.

As to the carbon fibers, the mode I interlayer fracture toughness $G_{IC}$ (at 5% offset in accordance with JIS K 7086) of the composite comprising the carbon fibers and an epoxy resin as matrix is 0.15 kJ/m$^2$ or more, preferably 0.16 kJ/m$^2$ or more, more preferably 0.17 kJ/m$^2$ or more, but preferably less than 4.5 kJ/m$^2$. The interlayer fracture toughness $G_{IC}$ less than 0.15 kJ/m$^2$ is not desirable, because fracture due to delamination tends to occur.

The mode I interlayer fracture toughness $G_{IR}$ (at propagation in accordance with JIS K 7086) of the composite comprising the carbon fibers and an epoxy resin as matrix is 0.2 kJ/m$^2$ or more, preferably 0.24 kJ/m$^2$ or more, more preferably 0.28 kJ/m$^2$ or more, but preferably less than 5 kJ/m$^2$. The interlayer fracture toughness $G_{IR}$ less than 0.2 kJ/m$^2$ is not desirable, because fracture due to delamination tends to occur.

The mode II interlayer fracture toughness $G_{IIC}$ (at 5% offset in accordance with JIS K 7086) of the composite comprising the carbon fibers and an epoxy resin as matrix is 0.45 kJ/m$^2$ or more, preferably 0.47 kJ/m$^2$ or more, more preferably 0.49 kJ/m$^2$ or more, but preferably less than 9.5 kJ/m$^2$. The interlayer fracture toughness $G_{IIC}$ less than 0.45 kJ/m$^2$ is not desirable, because delamination due to impact or the like tends to occur.

The mode II interlayer fracture toughness $G_{IIR}$ (at propagation in accordance with JIS K 7086) of the composite comprising the carbon fibers and an epoxy resin as matrix is 0.5 kJ/m$^2$ or more, preferably 0.52 kJ/m$^2$ or more, more preferably 0.54 kJ/m$^2$ or more, but preferably less than 10 kJ/m$^2$. The interlayer fracture toughness $G_{IIR}$ less than 0.5 kJ/m$^2$ is not desirable, because delamination due to impact or the like tends to occur.

Further, as to the carbon fibers, it is preferable that, when tested by compression after impact in accordance with JIS K 7086, the composite comprising the carbon fibers and an epoxy resin as matrix does not cause any delamination by an impact energy of 1.4 J/mm or less.

The fiber-reinforced composite material to be obtained by the invention is a beam-shaped composite material having a cross-section in the form of I, T, C, or L letter or a plate-shaped composite material including one having a cross-section in an irregular shape. The fiber-reinforced composite material can also be a plate- or beam-shaped one having a regular or irregular curvature in the longitudinal direction.

According to the carbon fibers of the invention, the direction of the fibers may be nearly parallel to the longitudinal direction of a beam, or alternatively, the angle between the direction of orientation of the fibers and the longitudinal direction of the beam may be normally ±30° or less and is preferably ±10° or less.

The carbon fiber of the invention is used as whole or part of the reinforcing fibers constituting a fiber-reinforced composite material. For example, it is also preferable to use the carbon fiber of the invention in a proportion of 1 to 80% by volume, preferably 1 to 60% by volume, based on the total reinforcing fibers to thereby form a sandwich structure (second object). In the latter case, if the proportion of the carbon fiber of the invention is less than 1% by volume, the effect to enhance the impact resistance of the fiber-reinforced composite material is undesirably small.

The reinforcing fibers to be used in combination with the carbon fiber of the invention are carbon fibers, in particular PAN-based carbon fibers, because of light weight.

The tensile elastic modulus of the reinforcing fibers to be used in combination with the carbon fiber of the invention is preferably 200 to 1000 GPa. Meanwhile, the Charpy impact resistance of the reinforcing fibers to be used in combination with the carbon fiber of the invention is preferably 125 kJ/m$^2$ or more.

A matrix resin for use in the invention may be a thermoplastic resin or a thermosetting resin. Normally, examples of preferable resins may include a bismaleimide resin, a polyimide resin, an epoxy resin, and the like.

In the invention, the mode I interlayer fracture toughness $G_{IC}$ (at 5% offset in accordance with JIS K 7086), $G_{IR}$ (at propagation in accordance with JIS K 7086), the mode II interlayer fracture toughness $G_{IIC}$ (at 5% offset in accordance with JIS K 7086), $G_{IIR}$ (at propagation in accordance with JIS K 7086), and the physical values obtained by the test of compression after impact as specified by JIS K 7089 are each measured by using a carbon fiber-reinforced composite material obtained by lamination and shaping by use of unidirectional prepreg, which comprises as reinforcing fiber thereof the carbon fiber of the invention alone, in accordance with the corresponding testing method.

The epoxy resin as matrix resin for use in the testing methods may be a general-purpose resin such as a bisphenol A-type resin. In particular, the epoxy resin composition for use in the invention comprises 270 parts of YDF 170, 200 parts of YD 128, 320 parts of YDCN 701, 110 parts of YH 434, 100 parts of YP 50 (all manufactured by Tohto Kasei Co., Ltd.), 40 parts of dicyandiamide, and 30 parts of 3-(3,4-dichlorophenyl)-1,1-dimethylurea.

EXAMPLES

The following examples are given by way of explanation but not by way of limitation.

Example 1

Used in this example was a pitch-based carbon fiber A which had a tensile elastic modulus of 55 GPa and a density of 1.65 g/cm³ and the composite prepared from which and an epoxy resin as matrix exhibited a compressive strength of 870 MPa and a strain at compressive break of 2.9% in the compression test. The pitch-based carbon fibers A were aligned in one direction and impregnated with an epoxy resin so as to prepare a prepreg A of carbon fiber. The prepreg A of carbon fiber thus prepared had a carbon fiber content of 100 g/m² and an epoxy resin content of 37% by weight.

The prepreg A of carbon fiber was cut into squares having sides of 200 mm each and 28 plies thereof were stacked such that all of the directions of orientation of the carbon fiber A were the same. Next, in accordance with JIS K 7086, a Teflon sheet having a thickness of 12.5 μm was inserted into the central face of the stack as an initial crack and the stack was then cured in an autoclave at 130° C. for 1 hour while being loaded with a pressure of 7 kgf/cm² and vacuum-degassed. In this way, a shaped plate having a thickness of 3 mm was obtained.

A DCB (or Double Cantilever Beam) test specimen having a length of 100 mm in the direction of orientation of carbon fibers and a width of 20 mm in the direction at a right angle to the direction of orientation of carbon fibers was cut out of the shaped plate obtained above.

An ENF (or End Notched Flexure) test specimen having a length of 140 mm in the direction of orientation of carbon fibers and a width of 20 mm in the direction at a right angle to the direction of orientation of carbon fibers was also cut out of the shaped plate obtained above.

The test specimen preparation and the interlayer fracture toughness test of the above-mentioned DCB test specimen and ENF test specimen were conducted in accordance with JIS K 7086.

As shown in Table 1, the shaped article of Example 1 had excellent mode I interlayer fracture toughness $G_{IC}$, $G_{IR}$ and mode II interlayer fracture toughness $G_{IIC}$, $G_{IIR}$.

Comparative Example 1

Used in this example was a prepreg Q1113 manufactured by Toho Rayon Co., Ltd. which was prepared by impregnating a commercially available PAN-based carbon fiber HTA manufactured by Toho Rayon Co., Ltd. with an epoxy resin.

The PAN-based carbon fiber HTA had a tensile elastic modulus of 235 GPa and a density of 1.77 g/cm³. The composite prepared from the carbon fiber exhibited a compressive strength of 1400 MPa and a strain at compressive break of 1.2% in the compression test.

Prepreg Q1113 manufactured by Toho Rayon Co., Ltd. had a carbon fiber content of 150 g/m² and a resin content of 37% by weight.

Prepreg Q1113 manufactured by Toho Rayon Co., Ltd. was cut into squares having sides of 200 mm each and 22 plies thereof were stacked such that all of the directions of orientation of the PAN-based carbon fiber HTA were the same. Next, in accordance with JIS K 7086, a Teflon sheet having a thickness of 12.5 μm was inserted into the central face of the stack as an initial crack and the stack was then cured at 130° C. for 1 hour in an autoclave while being loaded with a pressure of 7 kgf/cm² and vacuum-degassed. In this way, a shaped plate having a thickness of 3 mm was obtained.

A DCB (or Double Cantilever Beam) test specimen having a length of 100 mm in the direction of orientation of carbon fibers and a width of 20 mm in the direction at a right angle to the direction of orientation of carbon fibers was cut out of the shaped plate obtained above.

An ENF (or End Notched Flexure) test specimen having a length of 140 mm in the direction of orientation of carbon fibers and a width of 20 mm in the direction at a right angle to the direction of orientation of carbon fibers was also cut out of the shaped plate obtained above.

The test specimen preparation and the interlayer fracture toughness test of the above-mentioned DCB test specimen and ENF test specimen were conducted in accordance with JIS K 7086.

As shown in Table 2, the mode I interlayer fracture toughness $G_{IC}$, $G_{IR}$ and mode II interlayer fracture toughness $G_{IIC}$, $G_{IIR}$ of the shaped article of Comparative Example 1 were inferior to those of Example 1.

Example 2

The prepreg A described in Example 1 was cut into sheets so that the angles of orientation of the carbon fiber A were 0°, 90°, +45°, and −45° and a stack of 40 plies made up of [+45°/0°/−45°/90°]5$_s$ was prepared. The stack was then cured in an autoclave at 130° C. for 1 hour while being loaded with a pressure of 7 kgf/cm² and vacuum-degassed. In this way, a shaped plate, which had a length of 400 mm in the direction at 0° to the direction of orientation of the carbon fiber A, a width of 400 mm in the direction at 90° to the direction of orientation of the carbon fiber A, and a thickness of 4.5 nmm, was obtained.

Test specimens for CAI (or Compression After Impact), which each had a length of 150 mm in the direction at 0° to the direction of orientation of the carbon fiber A and a width of 100 mm in the direction at 90° to the direction of orientation of the carbon fiber A, were cut out of the above-described sheet. By using the CAI test specimens, impact test, nondestructive test by ultrasonic examination, and compression test were conducted in accordance with JIS K 7089.

As shown in Table 3, the shaped plate of Example 2 exhibited excellent CAI characteristics because the impact-induced delamination area and delamination-induced reduction rate of compressive strength were slight.

Comparative Example 2

The prepreg Q1113, manufactured by Toho Rayon Co., Ltd. and described in Comparative Example 1, was cut into sheets so that the angles of orientation of the PAN-based carbon fiber HTA were 0°, 90°, +45°, and −45° and a stack of 32 plies made up of [+45°/0°/−45°/90°]4$_s$ was prepared. The stack was then cured in an autoclave at 130° C. for 1 hour while being loaded with a pressure of 7 kgf/cm² and vacuum-degassed. In this way, a shaped plate, which had a length of 400mm in the direction at 0° to the direction of orientation of the PAN-based carbon fiber HTA, a width of 400 mm in the direction at 90° to the direction of orientation of the PAN-based carbon fiber HTA, and a thickness of 4.5 nmm, was obtained.

Test specimens for CAI (or Compression After Impact), which each had a length of 150 mm in the direction at 0° to the direction of orientation of the PAN-based carbon fiber HTA and a width of 100 mm in the direction at 90° to the direction of orientation of the PAN-based carbon fiber HTA, were cut out of the above-described sheet. By using the CAI test specimens, impact test, nondestructive test by ultrasonic examination, and compression test were conducted in accordance with JIS K 7089.

As shown in Table 4, both of the impact-induced delamination area and delamination-induced reduction rate of compressive strength were large and therefore the CAI performances of the shaped plate of Comparative Example 2 were inferior to those of Example 2.

Example 3

The carbon fiber prepreg A of Example 1 was used in combination with Prepreg P3052S-12 which was manufactured by Toray Industries, Inc. by impregnating a PAN-based carbon fiber T700S manufactured by Toray Industries, Inc. with an epoxy resin.

The PAN-based carbon fiber T700S had a tensile elastic modulus of 230 GPa and a density of 1.8 g/cm$^3$. The composite prepared from the carbon fiber exhibited a compressive strength of 1450 MPa and a strain at compressive break of 1.2% in the compression test.

Prepreg P3052S-12, manufactured by Toray Industries, had a carbon fiber content of 125 g/m$^2$ and a resin content of 33% by weight.

The prepreg P3052S-12 was cut into squares having sides of 300 mm each and 15 plies thereof were stacked such that all of the directions of orientation of the carbon fiber T700S were the same. On each of the outermost surfaces of the front and back faces of the stack, a ply of the carbon fiber prepreg A in a square having sides of 300 mm each was placed such that the direction of orientation of the carbon fiber A was the same as that of the carbon fiber T700S.

The stack was then cured in an autoclave at 130° C. for 1 hour while being loaded with a pressure of 7 kgf/cm$^2$ and vacuum-degassed. In this way, a shaped plate, which had a thickness of 2 mm, was obtained.

The shaped plate of unidirectional carbon fiber-reinforced composite obtained in the above-described process had a sandwich structure comprising the carbon fiber A in front and back outermost layers and the carbon fiber T700S disposed therebetween.

Test specimens in the form of strips, which each had a length of 80 mm in the direction of orientation of carbon fibers and a width of 10 mm in the direction at right angle to the direction of orientation of carbon fibers, were cut out of the above-described sheet. The test specimens were subjected to a Charpy impact test by using an instrumented Charpy impact tester (manufactured by Toyo Seiki Seisakusho Co., Ltd.). In the tester, the distance between fulcrums for supporting the test specimen was 60 mm.

As shown in Table 5, the shaped plate of Example 3 exhibited high Charpy impact values, namely excellent impact resistance. At the same time, the shaped plate of Example 3 exhibited low flexural modulus, namely high flexibility.

Example 4

The carbon fiber prepreg A of Example 1 was used in combination with Prepreg P3052S-12 which was manufactured by Toray Industries, Inc. by impregnating a PAN-based carbon fiber T700S manufactured by Toray Industries, Inc. with an epoxy resin.

Prepreg P3052S-12 was cut into squares having sides of 300 mm each, and 12 plies thereof were stacked such that all of the directions of orientation of the carbon fiber T700S were the same. On each of the outermost surfaces of the front and back faces of the stack, 3 plies of the carbon fiber prepreg A in a square having sides of 300 mm each were placed such that the direction of orientation of the carbon fiber A was the same as that of carbon fiber T700S. Therefore, a total of 6 plies of the carbon fiber prepreg A were placed.

The stack was then cured in an autoclave at 130° C. for 1 hour while being loaded with a pressure of 7 kgf/cm$^2$ and vacuum-degassed. In this way, a shaped plate, which had a thickness of 2 mm, was obtained.

The shaped plate of unidirectional carbon fiber-reinforced composite obtained in the above-described process had a sandwich structure comprising the carbon fiber A in front and back outermost layers and the carbon fiber T700S disposed therebetween.

Test specimens in the form of strips, which each had a length of 80 mm in the direction of orientation of carbon fibers and a width of 10 mm in the direction at right angle to the direction of orientation of carbon fibers, were cut out of the above-described sheet. The test specimens were subjected to a Charpy impact test by using an instrumented Charpy impact tester (manufactured by Toyo Seiki Seisakusho Co., Ltd.). In the tester, the distance between fulcrums for supporting the test specimen was 60 mm.

As shown in Table 5, the shaped plate of Example 4 exhibited high Charpy impact values, namely excellent impact resistance. At the same time, the shaped plate of Example 4 exhibited low flexural modulus, namely high flexibility.

Example 5

The carbon fiber prepreg A of Example 1 was used in combination with Prepreg P3052S-12 which was manufactured by Toray Industries, Inc. by impregnating a PAN-based carbon fiber T700S manufactured by Toray Industries, Inc. with an epoxy resin.

Prepreg P3052S-12 was cut into squares having sides of 300 mm each and 8 plies thereof were stacked such that all of the directions of orientation of the carbon fiber T700S were the same. On each of the outermost surfaces of the front and back faces of the stack, 5 plies of the carbon fiber prepreg A in a square having sides of 300 mm each were placed such that the direction of orientation of the carbon fiber A was the same as that of carbon fiber T700S. Therefore, a total of 10 plies of the carbon fiber prepreg A were placed.

The stack was then cured in an autoclave at 130° C. for 1 hour while being loaded with a pressure of 7 kgf/cm$^2$ and vacuum-degassed. In this way, a shaped plate, which had a thickness of 2 mm, was obtained.

The shaped plate of unidirectional carbon fiber-reinforced composite obtained in the above-described process had a sandwich structure comprising the carbon fiber A in front and back outermost layers and the carbon fiber T700S disposed therebetween.

Test specimens in the form of strips, which each had a length of 80 mm in the direction of orientation of carbon fibers and a width of 10 mm in the direction at right angle to the direction of orientation of carbon fibers, were cut out of the above-described sheet. The test specimens were subjected to a Charpy impact test by using an instrumented Charpy impact tester (manufactured by Toyo Seiki Seisakusho Co., Ltd.). In the tester, the distance between fulcrums for supporting the test specimen was 60 mm.

As shown in Table 5, the shaped plate of Example 5 exhibited high Charpy impact values, namely excellent impact resistance. At the same time, the shaped plate of Example 5 exhibited low flexural modulus, namely high flexibility.

Example 6

Used in this example was a pitch-based carbon fiber B which had a tensile elastic modulus of 106 GPa and a density of 1.7 g/cm$^3$ and the composite prepared from which and an epoxy resin as matrix exhibited a compressive strength of 1070 MPa and a strain at compressive break of 2.1% in the compression test. The pitch-based carbon fibers B were aligned in one direction and impregnated with an epoxy resin so as to prepare a prepreg B of carbon fiber. The carbon fiber prepreg B thus prepared had a carbon fiber content of 125 g/m² and an epoxy resin content of 33% by weight.

The carbon fiber prepreg B was used in combination with Prepreg P3052S-12 which was manufactured by Toray Industries, Inc. by impregnating a PAN-based carbon fiber T700S manufactured by Toray Industries, Inc. with an epoxy resin.

Prepreg P3052S-12 was cut into squares having sides of 300 mm each and 15 plies thereof were stacked such that all of the directions of orientation of the carbon fiber T700S were the same. On each of the outermost surfaces of the front and back faces of the stack, a ply of the carbon fiber prepreg B in a square having sides of 300 mm each was placed such that the direction of orientation of the carbon fiber B was the same as that of the carbon fiber T700S. Therefore, a total of 2 plies of the carbon fiber prepreg B were placed.

The stack was then cured in an autoclave at 130° C. for 1 hour while being loaded with a pressure of 7 kgf/cm² and vacuum-degassed. In this way, a shaped plate, which had a thickness of 2 mm, was obtained.

The shaped plate of unidirectional carbon fiber-reinforced composite obtained in the above-described process had a sandwich structure comprising the carbon fiber B in front and back outermost layers and the carbon fiber T700S disposed therebetween.

Test specimens in the form of strips, which each had a length of 80 mm in the direction of orientation of carbon fibers and a width of 10 mm in the direction at right angle to the direction of orientation of carbon fibers, were cut out of the above-described sheet. The test specimens were subjected to a Charpy impact test by using an instrumented Charpy impact tester (manufactured by Toyo Seiki Seisakusho Co., Ltd.). In the tester, the distance between fulcrums for supporting the test specimen was 60 mm.

As shown in Table 5, the shaped plate of Example 6 exhibited high Charpy impact values, namely excellent impact resistance. At the same time, the shaped plate of Example 6 exhibited low flexural modulus, namely high flexibility.

Example 7

Used in this example was a pitch-based carbon fiber C which had a tensile elastic modulus of 150 GPa and a density of 1.85 g/cm³ and the composite prepared from which and an epoxy resin as matrix exhibited a compressive strength of 1150 MPa and a strain at compressive break of 1.8% in the compression test. The pitch-based carbon fibers C were aligned in one direction and impregnated with an epoxy resin so as to prepare a prepreg C of carbon fiber. The prepreg C of carbon fiber thus prepared had a carbon fiber content of 125 g/m² and an epoxy resin content of 33% by weight.

The prepreg C of carbon fiber was used in combination with Prepreg P3052S-12 which was manufactured by Toray Industries, Inc. by impregnating a PAN-based carbon fiber T700S manufactured by Toray Industries, Inc. with an epoxy resin.

Prepreg P3052S-12 was cut into squares having sides of 300 mm each and 16 plies thereof were stacked such that all of the directions of orientation of the carbon fiber T700S were the same. On each of the outermost surfaces of the front and back faces of the stack, a ply of the carbon fiber prepreg C in a square having sides of 300 mm each was placed such that the direction of orientation of the carbon fiber C was the same as that of the carbon fiber T700S. Therefore, a total of 2 plies of the carbon fiber prepreg C were placed.

The stack was then cured in an autoclave at 130° C. for 1 hour while being loaded with a pressure of 7 kgf/cm² and vacuum-degassed. In this way, a shaped plate, which had a thickness of 2 mm, was obtained.

The shaped plate of unidirectional carbon fiber-reinforced composite obtained in the above-described process had a sandwich structure comprising the carbon fiber C in front and back outermost layers and the carbon fiber T700S disposed therebetween.

Test specimens in the form of strips, which each had a length of 80 mm in the direction of orientation of carbon fibers and a width of 10 mm in the direction at right angle to the direction of orientation of carbon fibers, were cut out of the above-described sheet. The test specimens were subjected to a Charpy impact test by using an instrumented Charpy impact tester (manufactured by Toyo Seiki Seisakusho Co., Ltd.). In the tester, the distance between fulcrums for supporting the test specimen was 60 mm.

As shown in Table 5, the shaped plate of Example 7 exhibited high Charpy impact values, namely excellent impact resistance. At the same time, the shaped plate of Example 7 exhibited low flexural modulus, namely high flexibility.

Comparative Example 3

Prepreg P3052S-12, which was used in combination with the prepreg A of carbon fiber in Example 3 and which was manufactured by Toray Industries, Inc. by impregnating a PAN-based carbon fiber T700S manufactured by Toray Industries, Inc. with an epoxy resin, was used alone in this example.

Prepreg P3052S-12 was cut into squares having sides of 300 mm each and 17 plies thereof were stacked such that all of the directions of orientation of the carbon fiber T700S were the same.

The stack was then cured in an autoclave at 130° C. for 1 hour while being loaded with a pressure of 7 kgf/cm² and vacuum-degassed. In this way, a shaped plate, which had a thickness of 2 mm, was obtained.

Test specimens in the form of strips, which each had a length of 80 mm in the direction of orientation of carbon fibers and a width of 10 mm in the direction at right angle to the direction of orientation of carbon fibers, were cut out of the above-described sheet. The test specimens were subjected to a Charpy impact test by using an instrumented Charpy impact tester (manufactured by Toyo Seiki Seisakusho Co., Ltd.). In the tester, the distance between fulcrums for supporting the test specimen was 60 mm.

As shown in Table 6, the Charpy impact value of Comparative Example 3 was inferior to the Charpy impact values of Examples 3, 4, 5, 6, and 7. The flexural modulus of Comparative Example 3 was higher than the flexural moduli of Examples 3, 4, 5, 6, and 7 and therefore the plate of Comparative Example 3 had inferior flexibility.

Comparative Example 4

Glass fibers were aligned in one direction and impregnated with an epoxy resin so as to prepare a prepreg of glass fiber. The glass fiber had a tensile elastic modulus of 73 GPa and a density of 2.54 g/cm³. The composite prepared exhibited a compressive strength of 580 MPa and a strain at compressive break of 1.3% in the compression test The prepreg of glass fiber thus prepared had a glass fiber content of 100 g/m² and an epoxy resin content of 35% by weight.

The prepreg of glass fiber was used in combination with Prepreg P3052S-12 which was manufactured by Toray Industries, Inc. by impregnating a PAN-based carbon fiber T700S manufactured by Toray Industries, Inc. with an epoxy resin.

Prepreg P3052S-12 was cut into squares having sides of 300 mm each and 16 plies thereof were stacked such that all of the directions of orientation of the carbon fiber T700S were the same. On each of the outermost surfaces of the front and back faces of the stack, a ply of the prepreg of glass fiber in a square having sides of 300 mm each was placed such that the direction of orientation of the glass fiber was the same as that of the carbon fiber T700S. Therefore, a total of 2 layers of the prepreg of glass fiber were placed.

The stack was then cured in an autoclave at 130° C. for 1 hour while being loaded with a pressure of 7 kgf/cm$^2$ and vacuum-degassed. In this way, a shaped plate, which had a thickness of 2 mm, was obtained.

The shaped plate of unidirectional carbon fiber-reinforced composite obtained in the above-described process had a sandwich structure comprising the glass fiber in front and back outermost layers and the carbon fiber T700S disposed therebetween.

Test specimens in the form of strips, which each had a length of 80 mm in the direction of orientation of carbon fibers and a width of 10 mm in the direction at right angle to the direction of orientation of carbon fibers, were cut out of the above-described sheet. The test specimens were subjected to a Charpy impact test by using an instrumented Charpy impact tester (manufactured by Toyo Seiki Seisakusho Co., Ltd.). In the tester, the distance between fulcrums for supporting the test specimen was 60 mm.

As shown in Table 6, the Charpy impact value of Comparative Example 4 was inferior to the Charpy impact values of Examples 3, 4, 5, 6, and 7.

TABLE 1

Example concerning interlayer fracture toughness in the invention

| | Carbon fiber described in Claims | | | Interlayer fracture toughness kJ/m$^2$ | | | | |
|---|---|---|---|---|---|---|---|---|
| | Name of carbon fiber | Tensile elastic modulus GPa | Stain at compressive break % | Density g/cm$^3$ | Mode I | | Mode II | |
| | | | | | GIC | GIR | GIIC | GIIR |
| Example 1 | Carbon fiber A | 55 | 2.9 | 1.65 | 0.207 | 0.423 | 0.689 | 0.712 |

TABLE 2

Comparative Example concerning interlayer fracture toughness in the invention

| | Carbon fiber used in Comparative Example | | | Interlayer fracture toughness kJ/m$^2$ | | | | |
|---|---|---|---|---|---|---|---|---|
| | Name of carbon fiber | Tensile elastic modulus GPa | Stain at compressive break % | Density g/cm$^3$ | Mode I | | Mode II | |
| | | | | | GIC | GIR | GIIC | GIIR |
| Comparative Example 1 | HTA | 235 | 1.2 | 1.77 | 0.120 | 0.143 | 0.407 | 0.476 |

TABLE 3

Example concerning CAI (Compression After Impact) characteristics in the invention

| | Carbon fiber described in Claims | | | | CAI characteristics | | | | | |
|---|---|---|---|---|---|---|---|---|---|---|
| | Name of carbon fiber | Tensile elastic modulus GPa | Stain at compressive break % | Density g/cm$^3$ | Impact energy 1.0 J/mm | | Impact energy 1.5 J/mm | | Impact energy 2.0 J/mm | |
| | | | | | * | ** | * | ** | * | ** |
| Example 2 | Carbon fiber A | 55 | 2.9 | 1.65 | 0 | 0 | 770 | 51 | 1100 | 53 |

In Example 2, no delamination occurred when an impact energy of 1.4 J/mm was given.
*peeled area mm$^2$
**Rate of reduction in compressive strength % (with respect to faultless material)

TABLE 4

Comparative Example concerning CAI characteristics in the invention

| | Carbon fiber used in Comparative Example | | | CAI characteristics | | | | | |
| --- | --- | --- | --- | --- | --- | --- | --- | --- | --- |
| | Name of carbon fiber | Tensile elastic modulus GPa | Stain at compressive break % | Density g/cm³ | Impact energy 1.0 J/mm | | Impact energy 1.5 J/mm | | Impact energy 2.0 J/mm | |
| | | | | | * | ** | * | ** | * | ** |
| Comparative Example 2 | HTA | 235 | 1.2 | 1.77 | 760 | 62 | 1400 | 70 | 1950 | 74 |

*peeled area mm²
**Rate of reduction in compressive strength % (with respect to faultless material)

TABLE 5

Example concerning Charpy impact characteristics in the invention

| | Carbon fiber described in Claims in the invention | | | | Carbon fiber used in combination | | | | | | Number of ply Flexural modulus GPa |
| --- | --- | --- | --- | --- | --- | --- | --- | --- | --- | --- | --- |
| | Name of carbon fiber | Tensile elastic modulus GPa | Stain at Compressive break % | Density G/cm³ | Name of carbon fiber | Tensile elastic modulus GPa | Stain at Compressive break % | Density G/cm³ | Laminating proportion | Charpy impact kJ/m² | |
| Example 3 | Carbon fiber A | 55 | 2.9 | 1.65 | T700S | 230 | 1.2 | 1.8 | CFA/T700S/CFA 1/15/1 ply | 161 | 96 |
| Example 4 | Carbon fiber A | 55 | 2.9 | 1.65 | T700S | 230 | 1.2 | 1.8 | CFA/T700S/CFA 3/12/3 ply | 479 | 66 |
| Example 5 | Carbon fiber A | 55 | 2.9 | 1.65 | T700S | 230 | 1.2 | 1.8 | CFA/T700S/CFA 5/8/5 ply | 469 | 47 |
| Example 6 | Carbon fiber B | 105 | 2.1 | 1.7 | T700S | 230 | 1.2 | 1.8 | CFB/T700S/CFB 1/15/1 ply | 135 | 103 |
| Example 7 | Carbon fiber C | 150 | 1.8 | 1.85 | T700S | 230 | 1.2 | 1.8 | CFC/T700S/CFC 1/16/1 ply | 128 | 112 |

TABLE 6

Comparative Example concerning Charpy impact characteristics in the invention

| | Carbon fiber described in Claims in the invention | | | | Carbon fiber used in combination | | | | | | Number of ply Flexural modulus GPa |
| --- | --- | --- | --- | --- | --- | --- | --- | --- | --- | --- | --- |
| | Name of carbon fiber | Tensile elastic modulus GPa | Stain at Compressive break % | Density G/cm³ | Name of carbon fiber | Tensile elastic modulus GPa | Stain at Compressive break % | Density G/cm³ | Laminating proportion | Charpy impact kJ/m² | |
| Comparative Example 3 | — | — | — | — | T700S | 230 | 1.2 | 1.8 | T700S 17 ply | 106 | 122 |
| Comparative Example 4 | Glass fiber | 73 | 1.3 | 2.5 | T700S | 230 | 1.2 | 1.8 | GF/T700S/GF 1/16/1 ply | 110 | 100 |

What is claimed is:

1. A carbon fiber-reinforced composite material having carbon fibers aligned nearly parallel to the longitudinal direction, wherein the carbon fibers have a tensile elastic modulus of 5 to 160 GPa, a strain at compressive break of 1.7 to 5%, and a density of 1.5 to 1.9 g/cm³ and further the composite comprising said carbon fibers exhibits a mode I interlayer fracture toughness $G_{IC}$ (at 5% offset in accordance with JIS K 7086) of 0.15 to 4.5 kJ/m², a mode II interlayer fracture toughness $G_{IR}$ (at propagation in accordance with JIS K 7086) of 0.20 to 5 kJ/m², a mode II interlayer fracture toughness $G_{IIC}$ (at 5% offset in accordance with JIS K 7086) of 0.45 to 9.5 kJ/m², and a mode II interlayer fracture toughness $G_{IIR}$ (at propagation in accordance with JIS K 7086) of 0.5 to 10 kJ/m², and the composite produces no delamination by an impact energy of less than 1.4 J/mm in the test of compression after impact in accordance with JIS K 7089.

2. A carbon fiber-reinforced composite material according to claim 1, wherein the composite material is plate-shaped or beam-shaped.

3. A sandwiched-structured carbon fiber-reinforced composite material made up of at least one fiber-reinforced composite material comprising carbon fibers having a tensile elastic modulus of 200 to 1000 GPa wherein additional carbon fibers are disposed on the front and back faces or the front and back outermost faces of the composite material, wherein said additional carbon fibers have a tensile elastic modulus of 5 to 160 GPa, a strain at compressive break of 1.7 to 5%, and a density of 1.5 to 1.9 g/cm³ and further the composite comprising said additional carbon fibers exhibits a mode I interlayer fracture toughness $G_{IC}$ (at 5% offset in accordance with JIS K 7086) of 0.15 to 4.5 kJ/m², a mode II interlayer fracture toughness $G_{IR}$ (at propagation in accordance with JIS K 7086) of 0.20 to 5 kJ/m², and a mode II interlayer fracture toughness $G_{IIC}$ (at 5% offset in accordance with JIS K 7086) of 0.45 to 9.5 kJ/m².

4. A sandwiched-structured carbon fiber-reinforced composite material according to claim 3, wherein the composite material has a Charpy impact value of 25 kJ/m² or more.

5. A sandwiched-structured carbon fiber-reinforced composite material according to claim 3, wherein the composite material is plate-shaped or beam-shaped.

6. A sandwiched-structured carbon fiber-reinforced composite material made up of at least one fiber-reinforced composite material comprising carbon fibers having a tensile elastic modulus of 200 to 1000 GPa wherein additional carbon fibers are disposed on the front and back faces or the front and back outermost faces of the composite material, wherein said additional carbon fibers have a tensile elastic modulus of 5 to 160 GPa, a strain at compressive break of 1.7 to 5%, and a density of 1.5 to 1.9 g/cm³ and further the composite comprising said additional carbon fibers produces no delamination by an impact energy of less than 1.4 J/mm in the test of compression after impact in accordance with JIS K 7089.

7. A sandwiched-structured carbon fiber-reinforced composite material according to claim 6, wherein the composite material has a Charpy impact value of 25 kJ/m² or more.

8. A sandwiched-structured carbon fiber-reinforced composite material according to claim 6, wherein the composite material is plate-shaped or beam-shaped.

* * * * *